(12) United States Patent
Morita et al.

(10) Patent No.: US 8,941,909 B2
(45) Date of Patent: Jan. 27, 2015

(54) DISPLAY DEVICE

(75) Inventors: Takeomi Morita, Mobara (JP);
Takahiko Muneyoshi, Chiba (JP);
Hideki Nakagawa, Chiba (JP); Toshio Miyazawa, Chiba (JP); Katsumi Matsumoto, Mobara (JP)

(73) Assignee: Pixtronix, Inc., San Diego, CA (US)

( * ) Notice: Subject to any disclaimer, the term of this patent is extended or adjusted under 35 U.S.C. 154(b) by 213 days.

(21) Appl. No.: 13/472,600

(22) Filed: May 16, 2012

(65) Prior Publication Data
US 2012/0293851 A1    Nov. 22, 2012

(30) Foreign Application Priority Data

May 17, 2011    (JP) .................................. 2011-110513

(51) Int. Cl.
| | | |
|---|---|---|
| G02B 26/00 | (2006.01) | |
| G02B 26/02 | (2006.01) | |
| G02B 26/04 | (2006.01) | |
| G02B 6/35  | (2006.01) | |

(52) U.S. Cl.
CPC .............. *G02B 26/004* (2013.01); *G02B 6/353* (2013.01); *G02B 26/023* (2013.01); *G02B 26/04* (2013.01); *G02B 6/3584* (2013.01)
USPC ....................................................... 359/290

(58) Field of Classification Search
CPC ..... G02B 26/004; G02B 26/023; G02B 26/04
USPC ................................................. 359/228, 290
See application file for complete search history.

(56) References Cited

U.S. PATENT DOCUMENTS

| | | | |
|---|---|---|---|
| 7,573,547 B2    | 8/2009  | Palmateer et al. | |
| 7,911,681 B2    | 3/2011  | Ikegami et al.   | |
| 7,920,317 B2 *  | 4/2011  | Lee et al. ....................... | 359/228 |
| 2006/0250325 A1 | 11/2006 | Hagood et al.    | |
| 2010/0027100 A1 | 2/2010  | Lee et al.       | |
| 2010/0053717 A1 | 3/2010  | Takahashi        | |
| 2010/0245408 A1 | 9/2010  | Matsuoka et al.  | |

FOREIGN PATENT DOCUMENTS

| | | |
|---|---|---|
| CN | 101111800 A | 1/2008 |
| EP | 2 103 982   | 9/2009 |

(Continued)

OTHER PUBLICATIONS

European Search Report—EP12168902—Search Authority—Munich—Aug. 14, 2012.

(Continued)

*Primary Examiner* — Euncha Cherry
(74) *Attorney, Agent, or Firm* — Edward A. Gordon; Foley & Lardner LLP (57) ABSTRACT

Provided is a display device, including: a pair of substrates arranged at an interval; oil filled between the pair of substrates; a shutter arranged in the oil; a drive portion, which is arranged in the oil, for driving the shutter in a predetermined direction; and a wall portion provided in the oil and on one of the pair of substrates. The wall portion is positioned adjacent to the shutter in one of the predetermined direction of the shutter and a direction orthogonal to the predetermined direction. The wall portion has a height exceeding a height of the shutter in a thickness direction of the shutter. The wall portion has at least a part positioned lateral to the shutter.

15 Claims, 7 Drawing Sheets

(56) References Cited

FOREIGN PATENT DOCUMENTS

| JP | 2008170632 A | 7/2008 |
|---|---|---|
| JP | 2008-197668 | 8/2008 |
| KR | 20100100401 A | 9/2010 |
| KR | 20120012063 A | 2/2012 |
| WO | WO 2006/091738 A1 | 8/2006 |

OTHER PUBLICATIONS

Taiwan Search Report—TW101117260—TIPO—Mar. 14, 2014.

* cited by examiner

DISPLAY DEVICE

CROSS-REFERENCE TO RELATED APPLICATION

The present application claims priority from Japanese application JP 2011-110513 filed on May 17, 2011, the contents of which are hereby incorporated by reference into this application.

BACKGROUND OF THE INVENTION

1. Field of the Invention

The present invention relates to a display device.

2. Description of the Related Art

A micro-electro-mechanical system (MEMS) display is a display expected to replace a liquid crystal display (see Japanese Patent Application Laid-open No. 2008-197668). This display differs from a liquid crystal shutter type display utilizing polarization, and displays an image by opening and closing a light transmissive window using a mechanical shutter system. One shutter is opened/closed to enable ON/OFF operation for one pixel. The shutter is operated by an electrostatic attractive force.

The shutter is arranged in a space surrounded by a sealing member between a pair of light transmissive substrates, and the space is filled with oil. The oil is used to prevent a spring for driving the shutter from sticking, and to reduce a difference in optical refraction index with respect to the light transmissive substrates.

As one reliability test for the MEMS display, a test of dropping a test ball onto the light transmissive substrate was conducted. As a result, there was observed a phenomenon that the shutter was displaced and the spring disengaged. For comparison, a similar test was performed on an oil-less cell not having oil injected therein, but such damage was not observed. Therefore, the cause of the shutter damage was confirmed to be oil flow.

SUMMARY OF THE INVENTION

The present invention has an object to prevent shutter damage to be caused by oil flow.

(1) According to an exemplary embodiment of the present invention, there is provided a display device, including: a pair of substrates arranged at an interval; oil filled between the pair of substrates; a shutter arranged in the oil; a drive portion, which is arranged in the oil, for driving the shutter in a predetermined direction (for example, for driving the shutter to linearly reciprocate); and a wall portion provided in the oil and on one of the pair of substrates. The wall portion is positioned adjacent to the shutter in one of the predetermined direction of the shutter and a direction orthogonal to the predetermined direction. The wall portion has a height exceeding a height of the shutter in a thickness direction of the shutter. The wall portion has at least a part positioned lateral to the shutter. According to the present invention, the wall portion is provided to prevent flowing of oil, and hence it is possible to prevent the shutter from being damaged.

(2) In the display device according to Item (1), the wall portion may have at least a part positioned on at least one of both sides of the shutter in the direction orthogonal to the predetermined direction of the shutter.

(3) In the display device according to Item (2), at least the part of the wall portion may have a width in the predetermined direction of the shutter, which is larger than a length of the shutter in the predetermined direction.

(4) In the display device according to any one of Items (1) to (3), the wall portion may have at least a part positioned on at least one of both sides of the shutter in the predetermined direction.

(5) In the display device according to any one of Items (1) to (4), the wall portion may include a plurality of divided wall portions positioned adjacent to each other at an interval.

(6) In the display device according to any one of Items (1) to (5), the drive portion may be provided on one of the pair of substrates, and the wall portion may be provided on the one of the pair of substrates on which the drive portion is provided.

(7) In the display device according to any one of Items (1) to (5), the drive portion may be provided on one of the pair of substrates, and the wall portion may be provided on another of the pair of substrates that is different from the one of the pair of substrates on which the drive portion is provided.

(8) In the display device according to any one of Items (1) to (5), the drive portion may be provided on one of the pair of substrates, and the wall portion may include: a base portion provided on the one of the pair of substrates; and a columnar portion provided on another of the pair of substrates so as to be opposed to the base portion.

(9) In the display device according to any one of Items (1) to (8), the shutter may include a plurality of shutters arrayed in a plurality of columns and a plurality of rows, and adjacent shutters of the plurality of shutters may be arranged so that one of the adjacent shutters is arranged so as to avoid a parallel translation position of another of the adjacent shutters in at least one of the predetermined direction and the direction orthogonal to the predetermined direction.

DETAILED DESCRIPTION OF THE INVENTION

Hereinafter, embodiments of the present invention are described with reference to the drawings.

Figure 1:
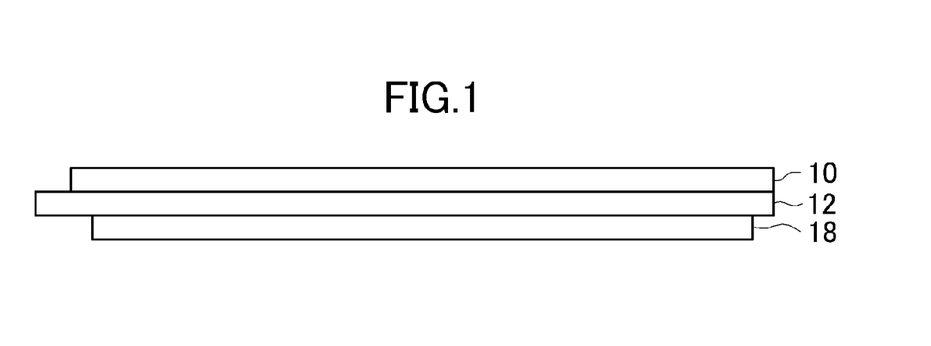
FIG. 1 is a side view of a display device according to an embodiment of the present invention.
Figure 2:
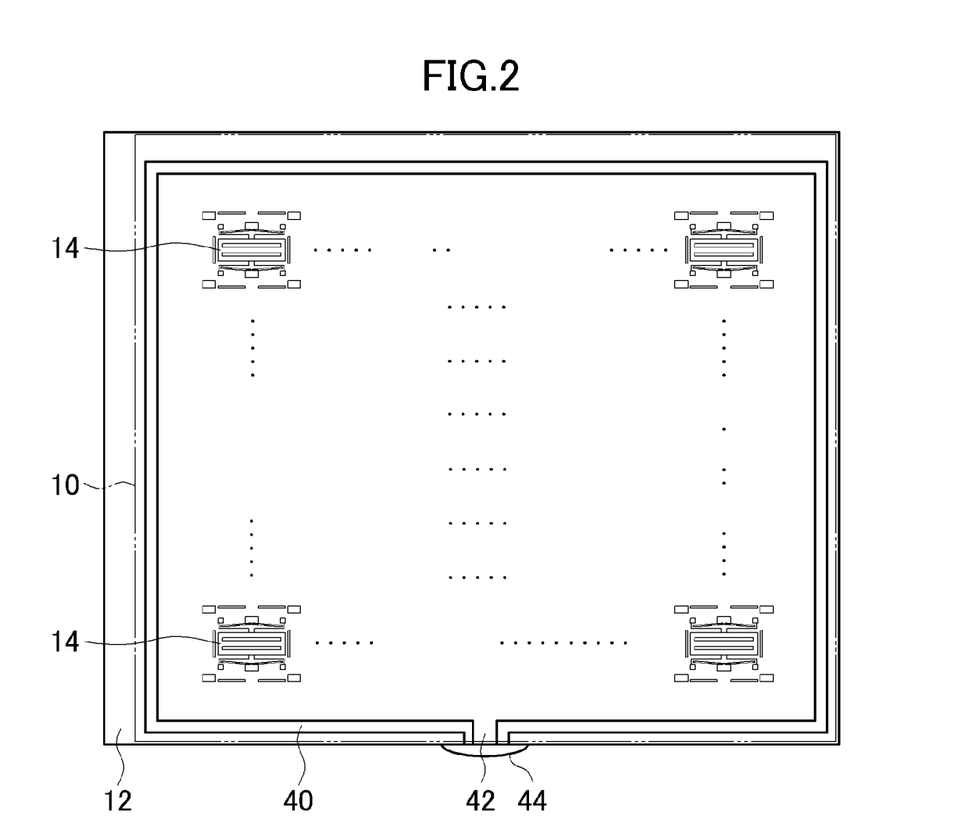
FIG. 2 is a plan view of the display device illustrated in FIG. 1.

FIG. 1 is a side view of a display device according to the embodiment of the present invention. The display device includes a pair of substrates 10 and 12 having light transmissivity (for example, glass substrates). The pair of substrates 10 and 12 are arranged so as to be opposed to each other at an interval (see FIG. 4). FIG. 2 is a plan view of the display device illustrated in FIG. 1. In FIG. 2, the upper substrate 10 is represented by a virtual line to show the inner structure. As illustrated in FIG. 2, a plurality of (large number of) shutters 14 are provided on the lower substrate 12.

Figure 3:
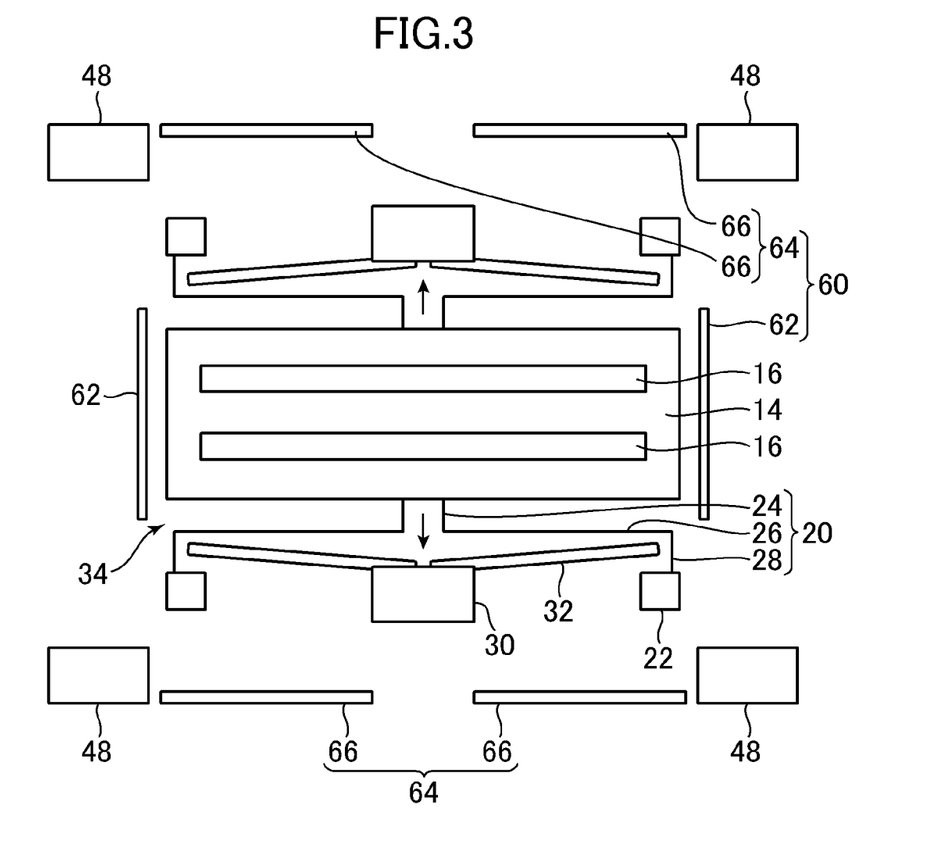
FIG. 3 is a plan view of a shutter and a drive portion thereof.

FIG. 3 is a plan view of the shutter and a drive portion thereof. The shutter 14 is a plate which is made of an inorganic material such as semiconductor or a metal, and includes a drive aperture 16. Light is allowed to pass through the drive aperture 16, and is blocked at a part other than the drive aperture 16 of the shutter 14. The drive aperture 16 has a shape long in one direction. Note that, as illustrated in FIG. 1, light is supplied from a backlight unit 18 lying under the substrates.

Figure 4:
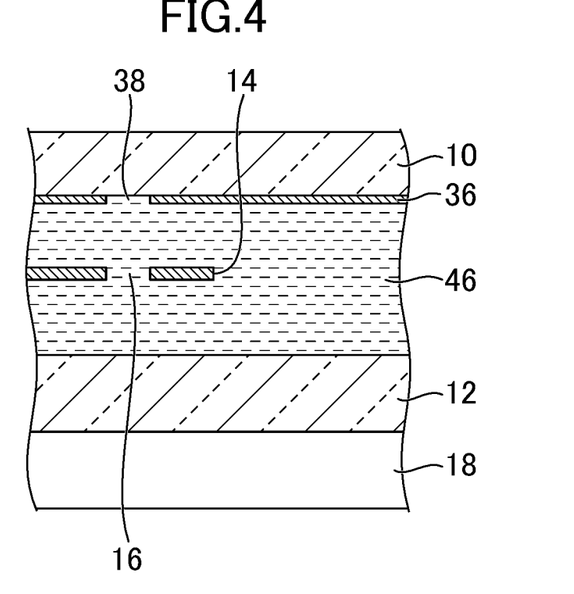
FIG. 4 is a sectional view of a part of the display device including the shutter.

The shutter 14 is supported by a first spring 20 to be suspended above the substrate 12 (see FIG. 4). A plurality of (four in FIG. 3) first springs 20 support the shutter 14. The first spring 20 is fixed to the substrate 12 by a first fixation portion 22.

The first spring 20 is made of an elastically deformable material, and is arranged so as to be deformable in a direction parallel to the plate surface of the shutter 14. Specifically, the first spring 20 includes a first portion 24 extending in a direction separating from the shutter 14 (direction intersecting (for example, orthogonal to) the length direction of the drive aperture 16), a second portion 26 extending in a direction along the length direction of the drive aperture 16 outwardly from a center of the drive aperture 16 in the length direction, and a third portion 28 further extending in the direction separating from the shutter 14 (direction intersecting (for example, orthogonal to) the length direction of the drive aperture 16). Further, as indicated by the arrows in FIG. 3, the shutter 14 is supported by the first spring 20 so as to be movable in the direction intersecting (for example, orthogonal to) the length direction of the drive aperture 16.

The substrate 12 is provided with a second spring 32 supported by a second fixation portion 30. The second spring 32 is opposed to the second portion 26 of the first spring 20 on a side separated from the shutter 14 with respect to the second portion 26. When a voltage is applied to the second fixation portion 30, due to the electrostatic attractive force caused by the potential difference between the second fixation portion 30 and the second portion 26 of the the first spring 20, the second portion 26 is attracted toward the second fixation portion 30. When the second portion 26 is attracted, the shutter 14 is also attracted via the first portion 24 provided integrally with the second portion 26. That is, the first spring 20 and the second spring 32 are provided for constituting a drive portion 34 for driving the shutter 14 to linearly reciprocate (driving the shutter 14 in a predetermined direction). The drive portion 34 is also made of an inorganic material such as semiconductor or a metal.

FIG. 4 is a sectional view of a part of the display device including the shutter. The upper substrate 10 has a light shielding film 36 formed thereon. A fixed aperture 38 is formed in the light shielding film 36. The above-mentioned drive aperture 16 of the shutter 14 and the fixed aperture 38 of the light shielding film 36 are arranged at positions opposed to each other. Light is allowed to pass when both of the apertures communicate with each other, and light is blocked when the fixed aperture 38 of the light shielding film 36 is covered due to the movement of the shutter 14. In other words, the shutter 14 is mechanically driven so as to control the passage and blocking of light through the fixed aperture 38 of the light shielding film 36. One drive aperture 16 and one fixed aperture 38 corresponding to each other constitute one pixel, and an image is displayed by a large number of pixels. Therefore, the plurality of (large number of) shutters 14 are provided. The shutters 14 and the drive portions 34 thereof are arranged in a display region which displays an image depending on the presence/absence and intensity of light passing through the drive aperture 16 and the fixed aperture 38.

The pair of substrates 10 and 12 are fixed at an interval with a sealing member 40 illustrated in FIG. 2. The sealing member 40 is provided in close contact with opposed surfaces of the pair of substrates 10 and 12. Further, as illustrated in FIG. 2, the sealing member 40 includes an opening 42 and is formed so as to surround a space. An end seal 44 closes the opening 42 of the sealing member 40, thereby encapsulating the space surrounded by the sealing member 40 to form an encapsulation space.

As illustrated in FIG. 4, oil 46 (for example, silicone oil) is filled in the encapsulation space. The shutter 14 and the drive portion 34 are arranged in the oil 46. The oil 46 can suppress vibrations caused by the movement of the shutter 14 and the drive portion 34, and also can prevent sticking of the first spring 20 and the second spring 32. When the substrates 10 and 12 are made of glass, with use of the oil 46 having a refractive index close to that of glass, through filling of the oil 46, it is possible to reduce light reflection at an interface of the pair of substrates 10 and 12.

Figure 5:
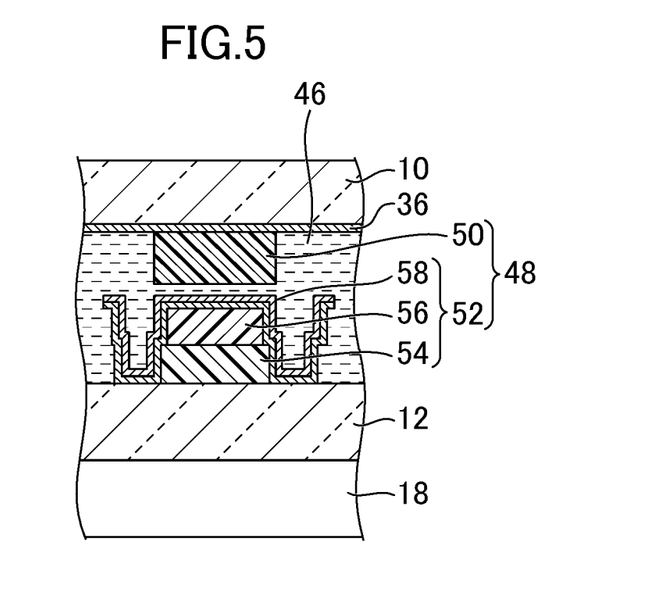
FIG. 5 is a sectional view of a part of the display device including a spacer.

As illustrated in FIG. 3, the display device includes a spacer 48 for maintaining an interval between the pair of substrates 10 and 12. FIG. 5 is a sectional view of a part of the display device including the spacer. The spacer 48 is arranged in the oil 46 as well. As illustrated in FIG. 3, the spacer 48 is provided offset from the shutter 14 in an oblique direction. Specifically, the spacer 48 is arranged so as to avoid a position offset from the shutter 14 in a driving direction of the shutter 14, and further avoid a position offset in a direction orthogonal to the driving direction. The spacer 48 may block the flow of the oil 46, but does not block the flow of the oil 46 in a direction most affecting the shutter (driving direction of the shutter 14 or direction orthogonal to the driving direction).

As illustrated in FIG. 5, the spacer 48 includes a first spacer portion 50 provided on the upper substrate 10, and a second spacer portion 52 provided on the lower substrate 12. The first spacer portion 50 is made of a resin. The second spacer portion 52 includes two layers of resin portions 54 and 56, and an inorganic portion 58 which is made of a semiconductor film or a metal film covering the surfaces of the resin portions 54 and 56. A gap is provided between the first spacer portion 50 and the second spacer portion 52, and the oil 46 enters between both the spacer portions. When a force is applied so that the substrates 10 and 12 approach each other, the gap between the first spacer portion 50 and the second spacer portion 52 becomes narrow, and thus the oil 46 therebetween flows.

As illustrated in FIG. 3, in addition to the spacer 48, a wall portion 60 is provided to the substrate 12. The wall portion 60 is arranged in the oil 46 as well. The wall portion 60 includes a first wall portion 62 and a second wall portion 64.

The first wall portion 62 is positioned adjacent to (on both sides or one side of) the shutter 14 in a direction orthogonal to the driving direction of the shutter 14 (right-left direction in FIG. 3). The length of the first wall portion 62 (width of the first wall portion 62 in the driving direction of the shutter 14) exceeds the length (width) of the shutter 14 in the driving direction. Further, the length (width) of the first wall portion 62 is preferred to be equal to or larger than the length (width) of a region in which the shutter 14 is driven to linearly reciprocate. In this manner, no matter where the driven shutter 14 is positioned, the first wall portion 62 is always arranged lateral to the shutter 14.

The second wall portion 64 is positioned adjacent to (on both sides or one side of) the shutter 14 in the driving direction of the shutter 14 (up-down direction in FIG. 3). The second wall portion 64 is arranged between a pair of spacers 48. A gap is provided between the second wall portion 64 and the spacers 48. Further, the second wall portion 64 includes a plurality of divided wall portions 66. A gap is provided between the adjacent divided wall portions 66. The oil 46 flows through the gaps, but the flow of the oil 46 is still controlled by the divided wall portions 66.

According to this embodiment, the wall portion 60 is provided to prevent the flowing of the oil 46, and hence it is possible to prevent the shutter 14 from being damaged.

Figure 6:
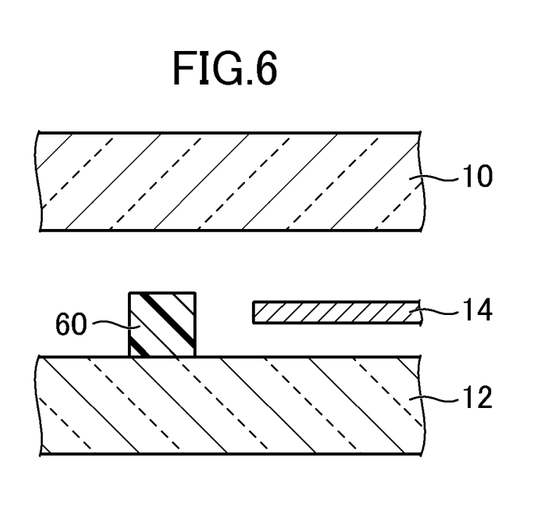
FIG. 6 is a view illustrating a vertical cross-section of a part of the display device including a wall portion.

FIG. 6 is a view illustrating a vertical cross-section of a part of the display device including the wall portion. The wall portion 60 is provided on the one substrate 12 on which the drive portion 34 is provided. The wall portion 60 has a height exceeding that of the shutter 14 in a thickness direction of the shutter 14. The wall portion 60 has at least a part positioned lateral to the shutter 14.

Figure 7:
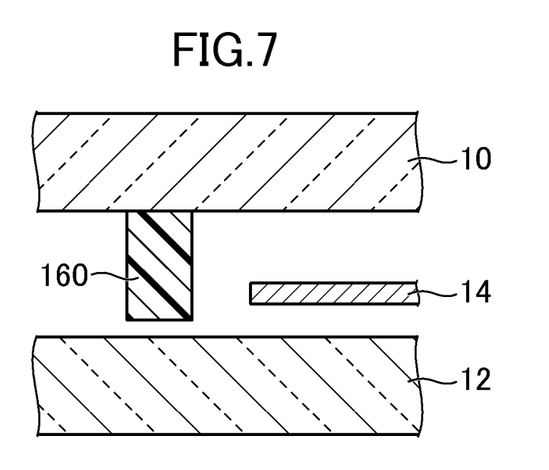
FIG. 7 is a view illustrating a vertical cross-section of a part of the display device including a modified example of the wall portion.

Alternatively, as a modified example, as illustrated in FIG. 7, a wall portion 160 may be provided to the other substrate 10 that is different from the one substrate 12 on which the drive portion 34 is provided. Also in this case, the wall portion 160 has a height exceeding that of the shutter 14 in the thickness direction of the shutter 14. That is, the wall portion 160 extends downward from the upper substrate 10 in FIG. 7, passes the lateral side of the shutter 14, and further extends downward below the shutter 14.

Figure 8:
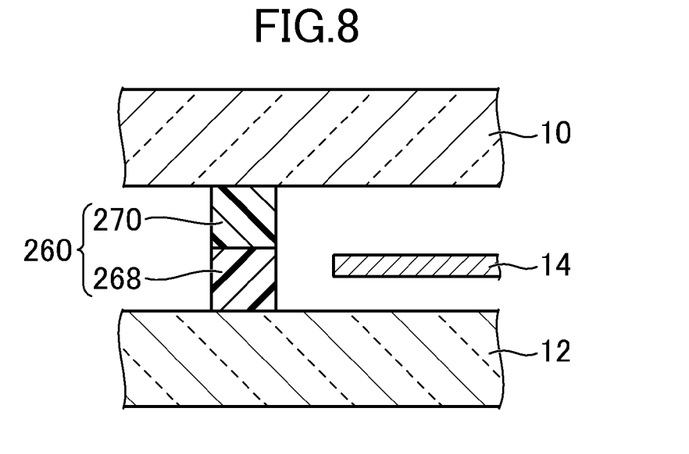
FIG. 8 is a view illustrating a vertical cross-section of a part of the display device including another modified example of the wall portion.

Alternatively, as another modified example, as illustrated in FIG. 8, a wall portion 260 may include a base portion 268 provided on the one substrate 12, and a columnar portion 270 provided on the other substrate 10 so as to be opposed to the base portion 268. Also in this case, the wall portion 260 has a part positioned lateral to the shutter 14. Note that, a gap may be provided between the base portion 268 and the columnar portion 270, or the base portion 268 and the columnar portion 270 may be brought into close contact with each other. The wall portion 260 illustrated in FIG. 8 also functions as a spacer of the pair of substrates 10 and 12.

Figure 9:
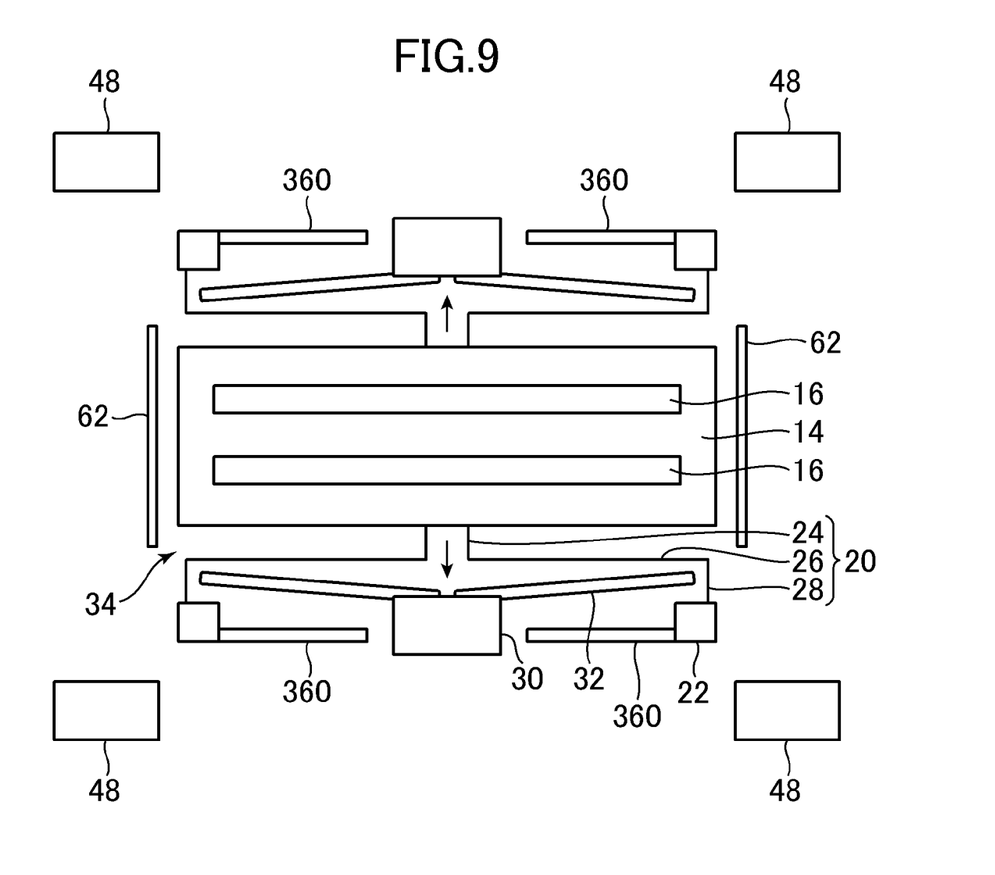
FIG. 9 is a plan view illustrating further another modified example of the wall portion.

As further another modified example, as illustrated in FIG. 9, a wall portion 360 may be arranged at a position closer to the shutter 14 than the spacer 48 (for example, adjacent to the first fixation portion 22). In this case, a part of the drive portion (first fixation portion 22) and the wall portion 360 may be integrated with each other.

Figure 10:
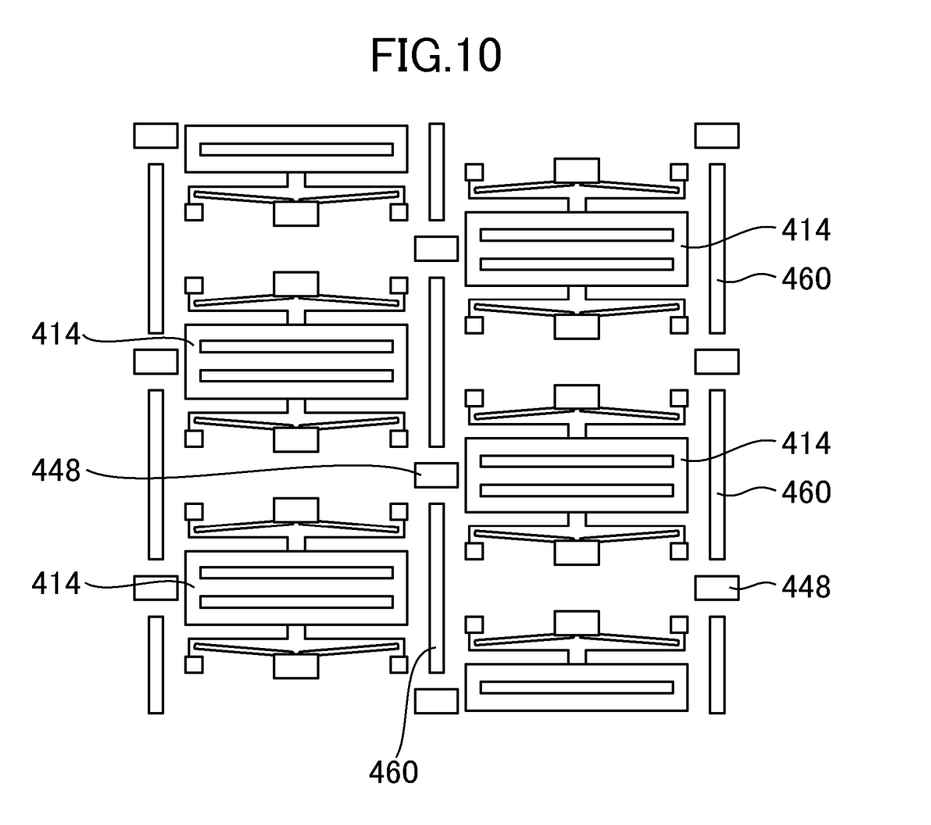
FIG. 10 is a view illustrating a display device according to another embodiment of the present invention.

FIG. 10 is a view illustrating a display device according to another embodiment of the present invention. In this embodiment, a plurality of shutters 414 are arrayed in a plurality of rows and a plurality of columns. Adjacent shutters 414 are arranged so that one of the adjacent shutters 414 is arranged so as to avoid a parallel translation position of the other of the adjacent shutters 414 in at least one of the driving direction and the direction orthogonal to the driving direction. Specifically, the shutters 414 are arrayed in one line in each of the columns (up-down direction in FIG. 10), but are arrayed obliquely in the row direction (right-left direction in FIG. 10). That is, the shutters 414 are arranged in a staggered manner.

Also in this embodiment, a wall portion 460 prevents the flowing of the oil 46. The wall portion 460 is arranged adjacent to each of the shutters 414 on one side in a direction orthogonal to the driving direction of the shutter 414. A spacer 448 is arranged adjacent to the shutter 414 on a side opposite to the one side.

Figure 11:
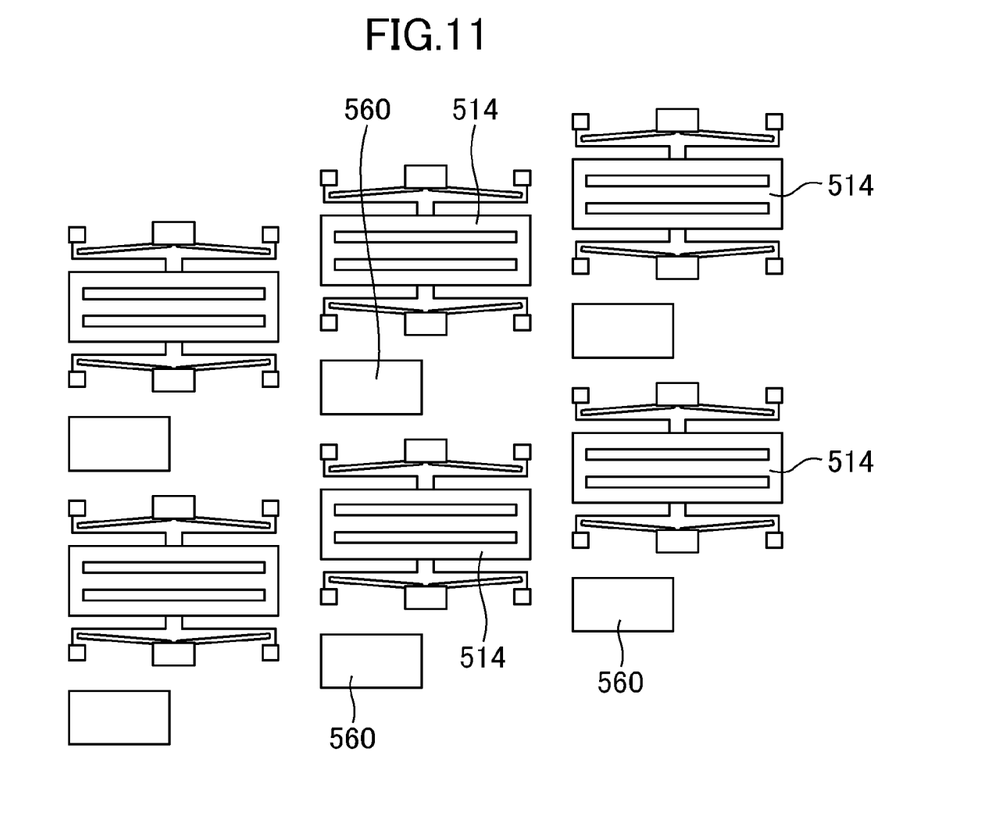
FIG. 11 is a view illustrating a display device according to further another embodiment of the present invention.

FIG. 11 is a view illustrating a display device according to further another embodiment of the present invention. In this embodiment, a plurality of shutters 514 are arrayed in a plurality of rows and a plurality of columns. Shutters 514 are arrayed in one line in each of the columns (up-down direction in FIG. 11), but are arrayed obliquely in the row direction (right-left direction in FIG. 11). That is, the adjacent shutters 514 are arranged so that one of the adjacent shutters 514 is arranged so as to avoid a parallel translation position of the other of the adjacent shutters 514 in at least one of the driving direction and the direction orthogonal to the driving direction.

Also in this embodiment, a wall portion 560 prevents the flowing of the oil 46. The wall portion 560 is arranged adjacent to each of the shutters 514 on both sides in the driving direction of the shutter 514. The wall portion 560 also functions as a spacer.

Figure 12:
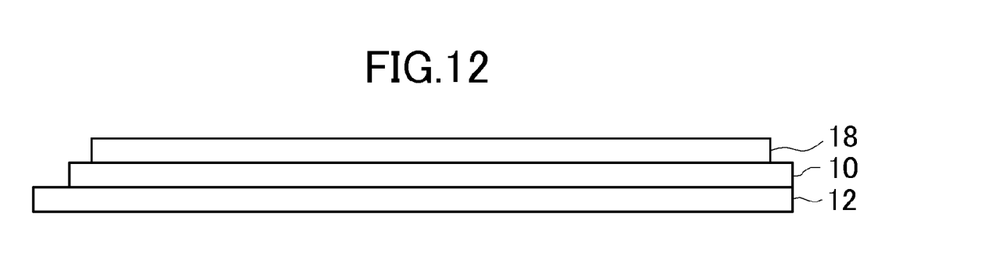
FIG. 12 is a view illustrating a modified example of the display device according to the embodiment of the present invention.

The present invention is not limited to the above-mentioned embodiments, and various modifications may be made thereto. For example, in the above-mentioned embodiments, the substrate 12 on which the shutter 14 is formed is arranged on the backlight unit 18 side, but as illustrated in FIG. 12, there may be employed a structure in which the substrate 10 on which the light shielding film 36 and the fixed aperture 38 are formed is arranged on the backlight unit 18 side. Further, the structures described in the embodiments may be replaced by substantially the same structure, a structure which has the same action and effect, or a structure which can achieve the same object.

What is claimed is:

1. A display device, comprising:
    a first substrate;
    a second substrate opposed to the first substrate;
    oil filled between the first and second substrates;
    a shutter arranged in the oil;
    an electrostatic actuator arranged in the oil and configured for driving the shutter in a predetermined direction; and
    a wall provided in the oil and on one of the first and second substrates,
    wherein the wall is positioned alongside the shutter, has a shape elongated along the predetermined direction, and has a height exceeding a height of the shutter in a thickness direction of the shutter.

2. The display device according to claim 1, wherein the wall has at least a part positioned on at least one side of the shutter in a direction orthogonal to the predetermined direction.

3. The display device according to claim 2, wherein at least the part of the wall has a width in the predetermined direction of the shutter, which is larger than a length of the shutter in the predetermined direction.

4. The display device according to claim 1, wherein the wall has at least a part positioned on at least one of both sides of the shutter in the predetermined direction.

5. The display device according to claim 1, wherein the wall comprises a plurality of divided wall portions positioned adjacent to each other at an interval.

6. The display device according to claim 1,
    wherein both the electrostatic actuator and the wall are provided on the first substrate.

7. The display device according to claim 1,
    wherein the electrostatic actuator is provided on the first substrate, and
    wherein the wall is provided on the second substrate.

8. The display device according to claim 1,
    wherein the electrostatic actuator is provided on the first substrate, and
    wherein the wall comprises:
        a base portion provided on the first substrate; and
        a columnar portion provided on the second substrate so as to be opposed to the base portion.

9. The display device according to claim 6, further comprising a backlight unit opposed to the first and second of substrates,
wherein the first substrate is arranged on a side opposite to the backlight unit.

10. The display device according to claim 7, further comprising a backlight unit opposed to the first and second substrates,
wherein the first substrate is arranged on a side opposite to the backlight unit.

11. The display device according to claim 8, further comprising a backlight unit opposed to the first and second substrates,
wherein the first substrate is arranged on a side opposite to the backlight unit.

12. The display device according to claim 6, further comprising a backlight unit opposed to the first and second substrates,
wherein the first substrate is arranged on the backlight unit side.

13. The display device according to claim 7, further comprising a backlight unit opposed to the first and second substrates,
wherein the first substrate is arranged on the backlight unit side.

14. The display device according to claim 8, further comprising a backlight unit opposed to the first and second substrates,
wherein the substrate is arranged on the backlight unit side.

15. The display device according to claim 1,
further comprising a plurality of shutters arrayed in a plurality of columns and a plurality of rows between the first and second substrates,
wherein adjacent shutters of the plurality of shutters are arranged so that one of the adjacent shutters is arranged so as to avoid a parallel translation position of another of the adjacent shutters in at least one of the predetermined direction and a direction orthogonal to the predetermined direction.

* * * * *